US008884481B2

(12) United States Patent
Hasegawa

(10) Patent No.: US 8,884,481 B2
(45) Date of Patent: Nov. 11, 2014

(54) STATOR FOR BICYCLE GENERATOR HUB

(75) Inventor: Hiroshi Hasegawa, Osaka (JP)

(73) Assignee: Shimano Inc., Osaka (JP)

( * ) Notice: Subject to any disclaimer, the term of this patent is extended or adjusted under 35 U.S.C. 154(b) by 197 days.

(21) Appl. No.: 13/551,470

(22) Filed: Jul. 17, 2012

(65) Prior Publication Data

US 2013/0049547 A1 Feb. 28, 2013

(30) Foreign Application Priority Data

Aug. 26, 2011 (JP) .................................. 2011-184384

(51) Int. Cl.
| | |
|---|---|
| H02K 9/02 | (2006.01) |
| B62J 6/12 | (2006.01) |
| H02K 7/18 | (2006.01) |
| H02K 37/00 | (2006.01) |
| G04C 13/11 | (2006.01) |
| H02K 1/22 | (2006.01) |

(52) U.S. Cl.
CPC ........ *H02K 7/1846* (2013.01); *B62J 6/12* (2013.01)
USPC .................. 310/67 A; 310/49.13; 310/263

(58) Field of Classification Search
CPC ................................ B62J 6/12; H02K 7/1846
USPC ............................ 310/67 A, 49, 263
See application file for complete search history.

(56) References Cited

U.S. PATENT DOCUMENTS

| | | | | |
|---|---|---|---|---|
| 6,133,669 | A * | 10/2000 | Tupper ........................... | 310/263 |
| 7,199,500 | B2 * | 4/2007 | Yoshida ........................ | 310/257 |
| 7,628,518 | B2 * | 12/2009 | Fujii et al. ..................... | 362/476 |
| 7,638,919 | B2 * | 12/2009 | Pulnikov et al. .............. | 310/257 |
| 2004/0079612 | A1 * | 4/2004 | Endo et al. .................... | 192/217 |
| 2010/0123371 | A1 * | 5/2010 | Lin ............................. | 310/67 A |

FOREIGN PATENT DOCUMENTS

| | | |
|---|---|---|
| CN | 101741201 A | 6/2010 |
| JP | 2001-37108 A | 2/2001 |
| JP | 3644636 B2 | 11/2003 |
| TW | 509427 U | 11/2002 |
| TW | 201126873 A | 8/2011 |

\* cited by examiner

*Primary Examiner* — John K Kim
*Assistant Examiner* — Rashad Johnson
(74) *Attorney, Agent, or Firm* — Global IP Counselors

(57) ABSTRACT

A stator is provided for a bicycle generator hub. The stator comprises a coil bobbin and a plurality of first and second yokes. The first and second yokes are radially arranged on opposite axial ends of the bobbin. Each of the first and second yokes includes a magnetic pole section extending along an axial direction of the coil bobbin and facing the external circumferential surface of the coil bobbin, an insertion section t extending along the axial direction of the coil bobbin and facing the internal circumferential surface of the coil bobbin, and a connecting section extending radial direction of the coil bobbin and connecting the first magnetic pole section and the first insertion section together. The insertion sections of the first yokes have first end portions that abut two corresponding ones of second end portion of the insertion sections of the second yokes.

10 Claims, 5 Drawing Sheets

STATOR FOR BICYCLE GENERATOR HUB

CROSS-REFERENCE TO RELATED APPLICATIONS

This application claims priority under 35 U.S.C. §119 to Japanese Patent Application No. 2011-184384, filed Aug. 26, 2011. The entire disclosure of Japanese Patent Application No. 2011-184384 is hereby incorporated herein by reference.

BACKGROUND

1. Field of the Invention

This invention generally relates to a stator for a bicycle generator hub that forms a hub of a bicycle wheel.

2. Background Information

A bicycle generator hub is generally provided with a cylindrical rotor and a stator arranged inside the rotor. An example of a bicycle generator hub is disclosed in Japanese Laid-Open Patent Publication No. 3644636. The stator of a conventional bicycle generator hub basically has a hub shaft, an annular member that the hub shaft can pass through, a first yoke arranged at one end of the annular member, and a second yoke arranged at the other end of the annular member. In the conventional stator for a bicycle generator hub, the yokes are provided such that they do not rotate with respect to the annular member. The first and second yokes each have a magnetic pole section arranged on a radially outward side, an insertion section arranged inside the through hole, and a connecting section connecting the magnetic pole section and the insertion section together. The magnetic pole section is arranged to be oriented along a radial direction. The connecting section is bent slightly with respect to the magnetic pole section and arranged to be oriented in a direction that intersects a radial direction. As a result, in the first yoke and the second yoke, tip end portions of adjacent insertion sections can be made to contact each other without deviating from each other.

SUMMARY

With a conventional stator for a bicycle generator hub, it is necessary to bend the first yoke and the second yoke at an intermediate portion. Consequently, the process of manufacturing the first and second yokes is complex and the manufacturing cost of the stator can be high.

One object presented in the present disclosure is to lower the manufacturing cost of a stator for a bicycle generator hub.

In view of the state of the known technology, a stator is provided for a bicycle generator hub. The stator comprises a coil bobbin, a plurality of first yokes and a plurality of second yokes. The coil bobbin includes a tubular section having a first axial end, a second axial end, an internal circumferential surface disposed between the first and second axial ends and an external circumferential surface disposed between the first and second axial ends. The first yokes are radially arranged on the first axial end of the coil bobbin. Each of the first yokes includes a first magnetic pole section extending along an axial direction of the coil bobbin and facing the external circumferential surface of the coil bobbin, a first insertion section extending along the axial direction of the coil bobbin and facing the internal circumferential surface of the coil bobbin, and a first connecting section extending radial direction of the coil bobbin and connecting the first magnetic pole section and the first insertion section together. The second yokes are radially arranged on the second axial end of the coil bobbin. Each of the second yokes includes a second magnetic pole section extending along an axial direction of the coil bobbin and facing the external circumferential surface of the coil bobbin, a second insertion section extending along the axial direction of the coil bobbin and facing the internal circumferential surface of the coil bobbin, and a second connecting section extending radial direction of the coil bobbin and connecting the second magnetic pole section and the second insertion section together. Each of the first insertion sections has a first end portion. Each of the second insertion sections has a second end portion. Each of the first end portions of the first insertion sections abuts two corresponding ones of the second end portions of the second insertion sections.

With this stator for a bicycle generator hub, the first yokes and the second yokes are arranged in a radial form with respect to the coil bobbin such that the end portion of one of the first insertion sections is magnetically coupled to the abutting end portion of one of the second insertion sections, and all of the first yokes and second yokes are magnetically coupled. As a result, the first and second yokes have a flat plate-like shape and it is not necessary to bend them. Consequently, for example, the first yokes and the second yokes can be manufactured easily by merely press forming a metal plate. As a result, the process of manufacturing the stator can be simplified and the manufacturing cost of the stator can be lowered.

A stator for a bicycle generator hub according to a second aspect is the stator according to the first aspect, wherein each of the first yokes is made of a plurality of plates that are laminated together in a circumferential direction of the coil bobbin. With this aspect, it is easier to reduce eddy currents because the first yokes are laminated yokes.

A stator for a bicycle generator hub according to a third aspect is the stator according to the first or second aspect, wherein each of the second yokes is made of a plurality of plates laminated together in a circumferential direction of the coil bobbin. With this aspect, it is easier to reduce eddy currents because the second yokes are laminated yokes.

A stator for a bicycle generator hub according to a fourth aspect is the stator according to the any one of the first to third aspects, wherein the first magnetic pole sections of the first yokes extend linearly along the axial direction of the coil bobbin. With this aspect, the first magnetic pole sections can be formed easily because they extend linearly along an axial direction of the coil bobbin.

A stator for a bicycle generator hub according to a fifth aspect is the stator according to the any one of the first to fourth aspects, wherein the second magnetic pole sections of the second yokes extend linearly along the axial direction of the coil bobbin. With this aspect, the second magnetic pole sections can be formed easily because they extend linearly along an axial direction of the coil bobbin.

A stator for a bicycle generator hub according to a sixth aspect is the stator according to the any one of the first to fifth aspects, wherein the first connecting sections of the first yokes and the second connecting sections of the second yokes engage the coil bobbin so as to limit circumferential movement of first and second yokes relative to the coil bobbin. With this aspect, the first yokes and the second yokes are positioned with respect to one another by the coil bobbin.

A stator for a bicycle generator hub according to a seventh aspect is the stator according to the sixth aspect, further comprising a hub shaft and a coupling member. The hub shaft is disposed in the tubular section of the coil bobbin, and has a groove that extends in the axial direction of the coil bobbin. The coupling member non-rotatable couples the coil bobbin and the hub shaft together. The coupling member has a projection that is engaged with the groove of the hub shaft and a protrusion that is arranged between two adjacent ones of the first and second yokes. With this aspect, since the coupling member couples the coil bobbin and the hub shaft together non-rotatably, the first yokes and the second yokes positioned with respect to the coil bobbin are coupled non-rotatably with respect to the hub shaft.

A bicycle generator hub according to an eighth aspect is equipped with the stator for a bicycle generator hub as recited in any one of the first to seventh aspects. With this bicycle hub, the manufacturing cost of the bicycle generator hub can be lowered because it employs the stator recited in any one of the first to seventh aspects.

With the stator of the present disclosure, the first and second yokes have a flat plate-like shape and it is not necessary to bend them. Consequently, for example, the first and second yokes can be manufactured easily by merely press forming a metal plate. As a result, the process of manufacturing the stator can be simplified and the manufacturing cost of the stator can be lowered.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
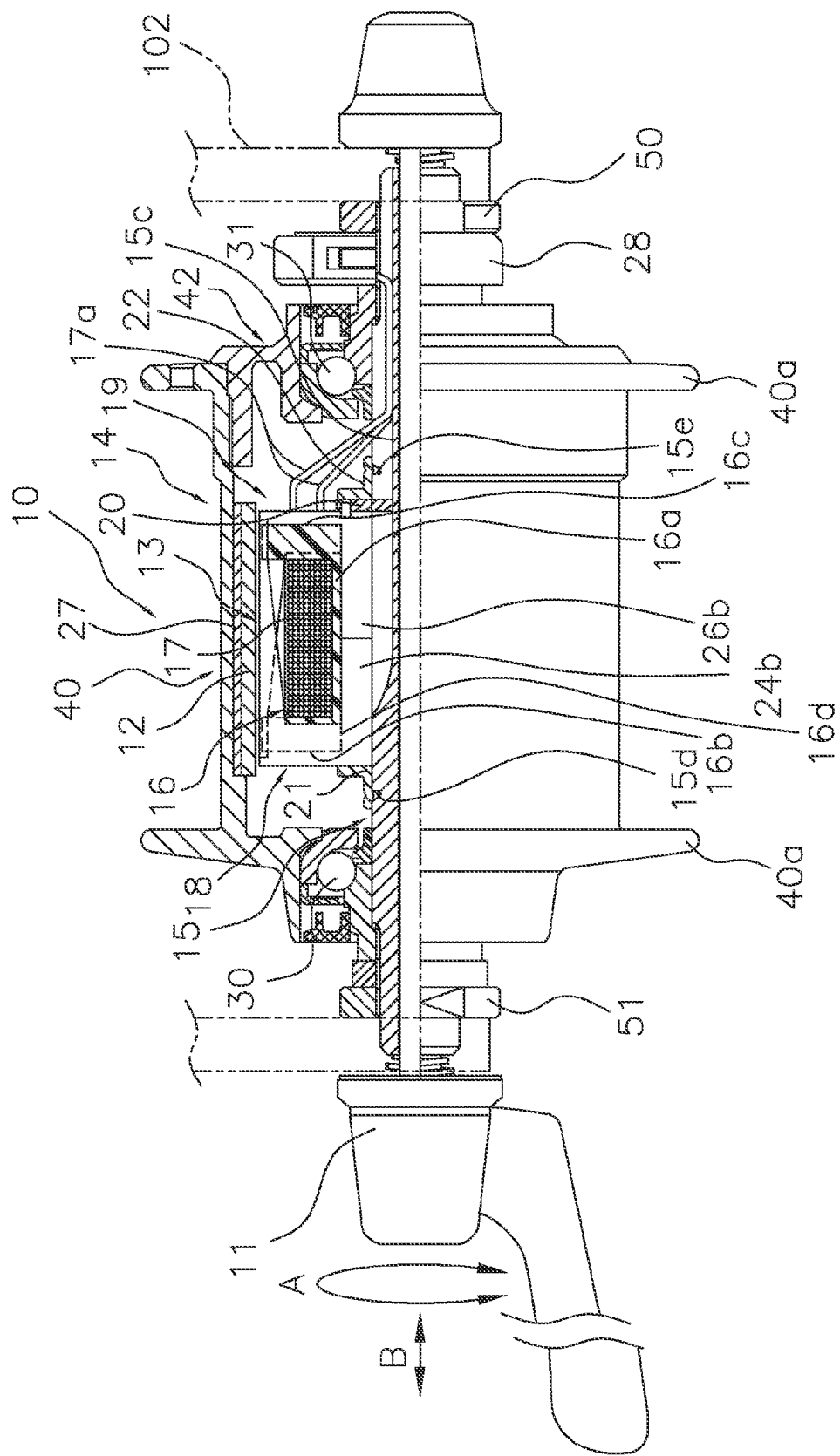
FIG. 1 is a half cross sectional view of a bicycle generator hub according to one illustrative embodiment.

Referring initially to FIG. 1, a bicycle generator hub 10 (e.g., a hub dynamo) is illustrated in accordance with one embodiment. As shown in FIG. 1, the bicycle generator hub 10 is installed on a front fork 102 of a bicycle. The generator hub 10 has an annular magnet 12, a stator 13, a hub shell 14 and a hub shaft 15. The hub shell 14 is attached rotatably to the hub shaft 15. The annular magnet 12 is provided on an internal circumferential surface of the hub shell 14. The magnet 12 has a plurality of magnetic poles arranged along a circumferential direction of the hub shell 14.

Figure 2:
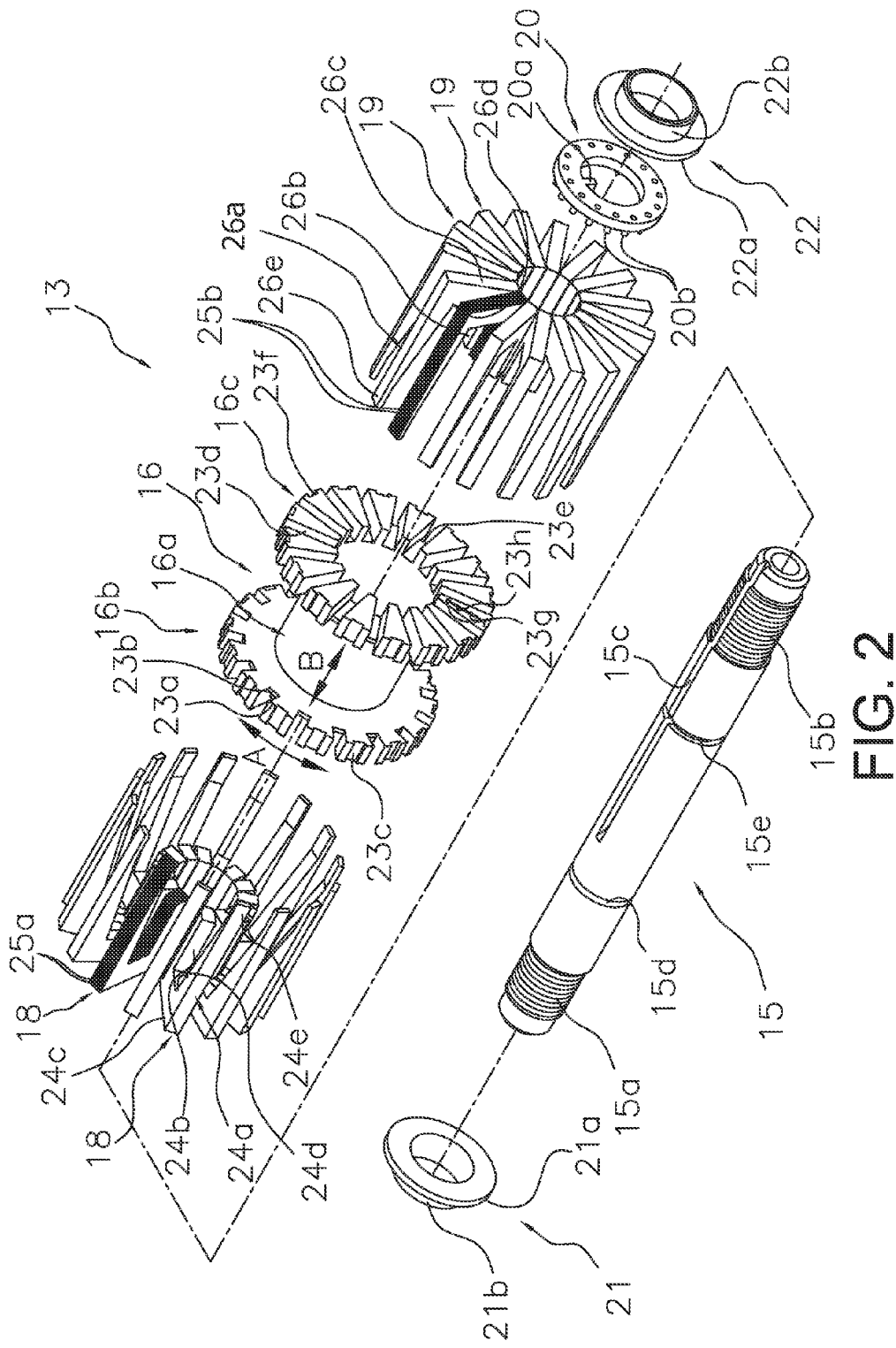
FIG. 2 is an exploded perspective view of the stator of the bicycle generator hub illustrated in FIG. 1.
Figure 4:
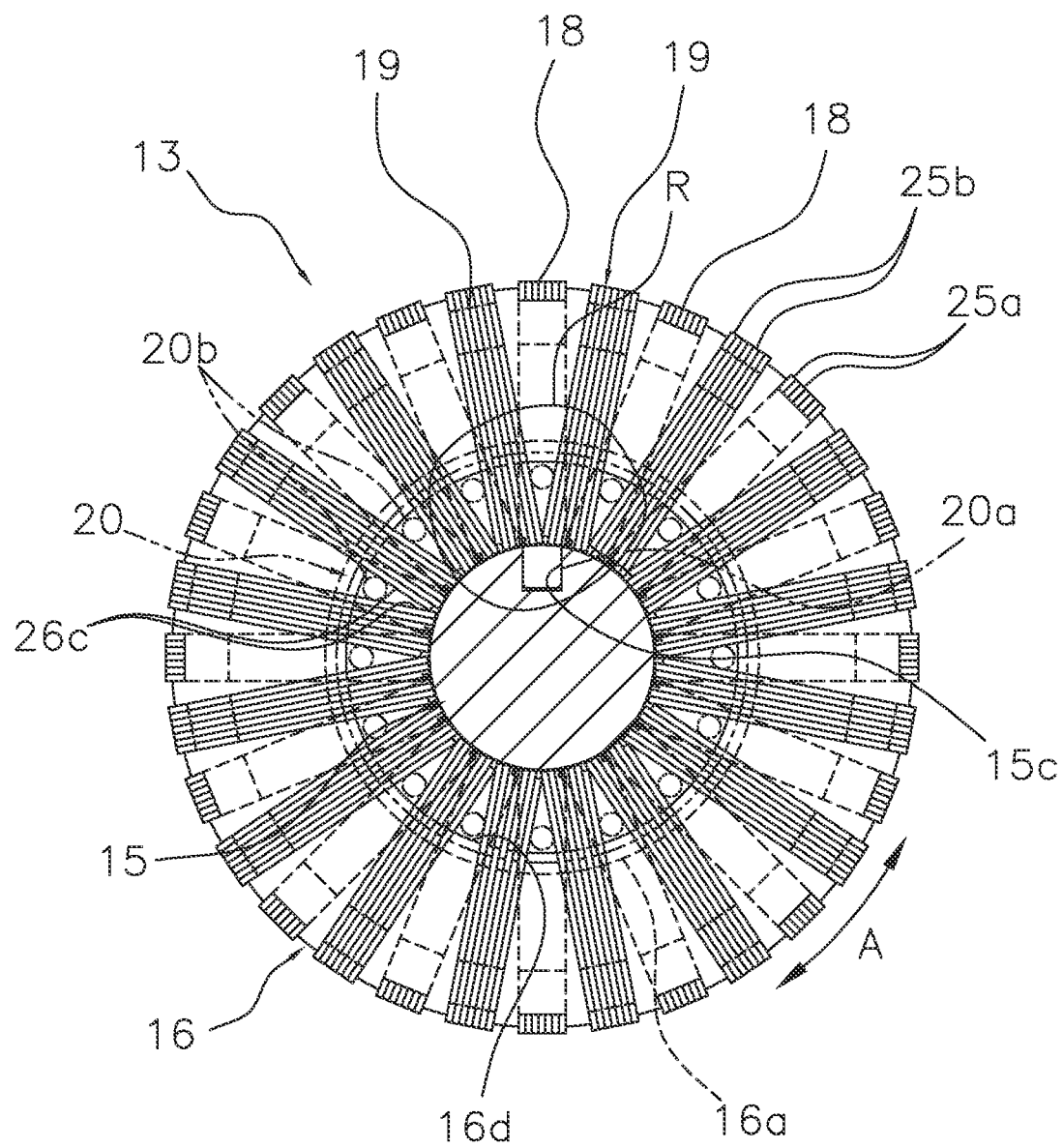
FIG. 4 is an axial end elevational view of the stator of the bicycle generator hub illustrated in FIGS. 1 and 2.

The stator 13 basically includes a coil bobbin 16, a coil 17, a plurality of first yokes 18 (e.g., sixteen) and a plurality of second yokes 19 (e.g., sixteen). The coil bobbin 16 is disposed on the hub shaft 15. The coil 17 is wound onto the coil bobbin 16. The first and second yokes 18 and 19 are provided on the coil bobbin 16. In FIGS. 1, 2 and 4, an arrow A indicates a circumferential direction of a coil bobbin 16, which is explained later. In FIGS. 1 and 2, arrow B indicates an axial direction of the coil bobbin 16. In this embodiment, the hub shaft 15, the coil bobbin 16, the first yokes 18 and the second yokes 19 (explained later) are arranged coaxially. Thus, the arrows A indicate a circumferential direction and the arrows B indicate an axial direction of all of these components.

The stator 13 is non-rotatably coupled to the hub shaft 15 by a coupling member 20 such that the stator 13 cannot rotate relative to the hub shaft 15. Thus, the coupling member 20 serves to couple the coil bobbin 16 and the hub shaft 15 together such that they cannot rotate relative to each other. The stator 13 also has a first positioning member 21 and a second positioning member 22. The stator 13 is axially positioned in the B direction (axial direction) by a first positioning member 21 and a second positioning member 22 such that the stator 13 faces the magnet 12. The first positioning member 21 is arranged on a first side (left side in FIG. 1) of the coil bobbin 16 in the axial direction as indicated by the arrow B (axial direction, see FIG. 1). The coupling member 20 and the second positioning member 22 are arranged on a second side (right side in FIG. 1) of the coil bobbin 16 along the axial direction as indicated by the arrow B (see FIG. 1). The coupling member 20 is sandwiched between the second positioning member 22 and the coil bobbin 16.

As shown in FIGS. 1 and 2, the hub shaft 15 is hollow and detachably fastened to the front fork 102 by, for example, a quick release mechanism 11. A first externally threaded section 15a is formed on an external circumferential surface of a first end (left-hand end in FIG. 1) of the hub shaft 15. A second externally threaded section 15b is formed on an external circumferential surface of a second end (right-hand end in FIG. 2) of the hub shaft 15. Additionally, an axial groove 15c extending in an axial direction from a middle portion to the second end is formed in the external circumferential surface of the hub shaft 15. The axial groove 15c is used to arrange an electrical wire 17a that extends from the coil 17. A first annular groove 15d and a second annular groove 15e are formed in the external circumferential surface of the hub shaft 15 for crimping the first and second positioning members 21 and 22, respectively. The second annular groove 15e is configured to cut across the axial groove 15c. A depth of the axial groove 15c is larger than a depth of the second annular groove 15e in order to accommodate arranging the electrical wire 17a.

A connector 28 is provided for supplying electric power from the coil 17 to a headlamp or other external devices. The connector 28 is fixed onto the second end of the hub shaft 15 by a nut member 50 which screws onto the second externally threaded section 15b.

The coil 17 is wound onto the coil bobbin 16. The first and second yokes 18 and 19 are attached to the coil bobbin 16 by an adhesive, for example. The coil bobbin 16 is positioned on the hub shaft 15 such that the coil bobbin 16 faces opposite an internal circumferential surface of the magnet 12. The coil bobbin 16 has a tubular (cylindrical) section 16a, a first flange 16b and a second flange 16c. The coil 17 is wound on an external circumferential surface of the tubular section 16a. The first flange 16b is provided on a first axial end of the tubular section 16a (left side in FIG. 1) with respect to the axial direction as indicated by the arrow B. The second flange 16c is provided on a second axial end of the tubular section 16a (right side in FIG. 1) with respect to the axial direction as indicated by the arrow B. The tubular section 16a has an internal circumferential surface that is disposed between first and second axial ends of the tubular section 16a. As shown in FIG. 1, the hub shaft 15 is inserted through a through hole 16d of the tubular section 16a. The coil bobbin 16 is non-rotatably coupled to the hub shaft 15 on the second side by the coupling member 20.

Figure 3:
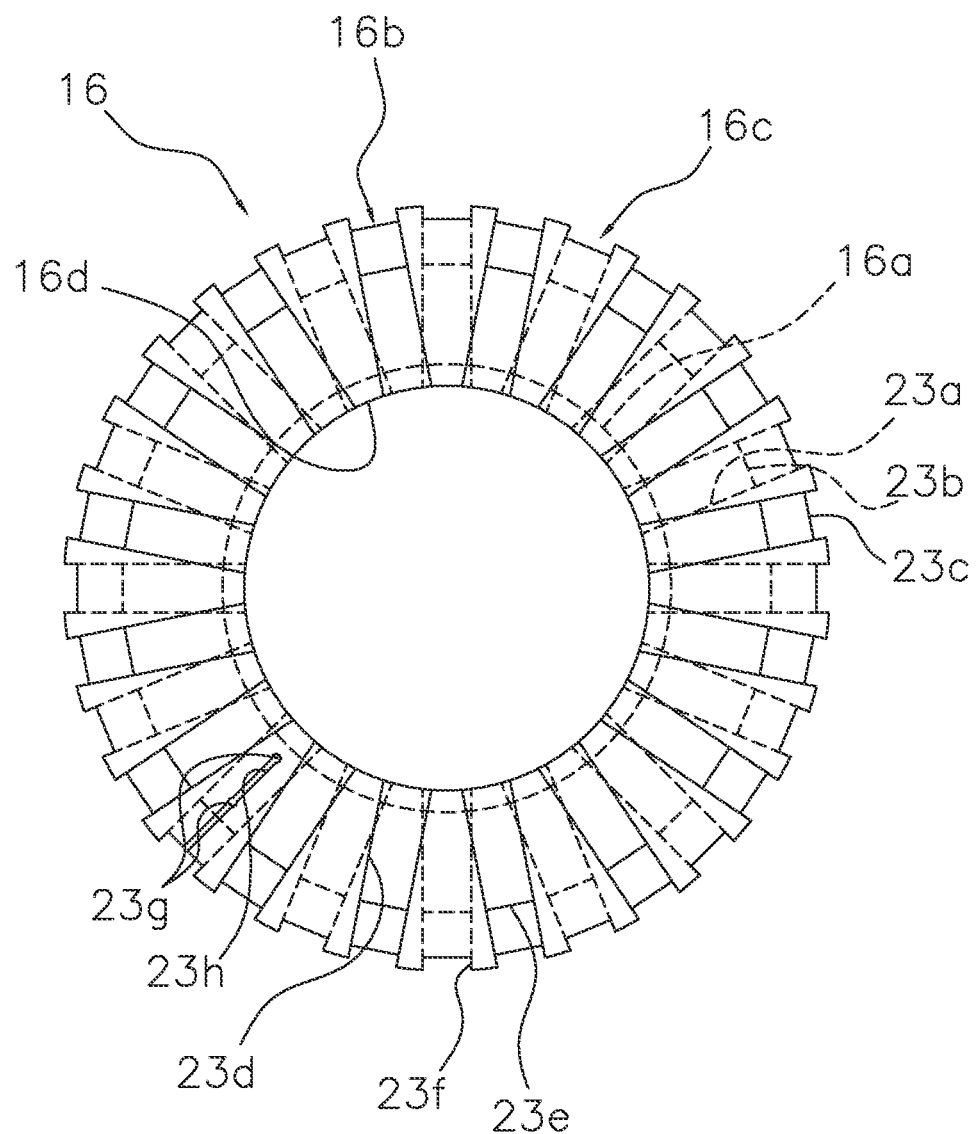
FIG. 3 is a side view of a coil bobbin of the stator of the bicycle generator hub illustrated in FIGS. 1 and 2.

As shown in FIGS. 2 and 3, a radially outward surface of the first flange 16b has a plurality of first grooves 23a (e.g., sixteen). The first grooves 23a are spaced apart from one another in a circumferential direction. The first grooves 23a are used to attach the first yokes 18. The first grooves 23a extend radially outward from the through hole 16d. A first notch 23b is formed by notching out a radially outward portion of the first flange 16b. Thus, the first notch 23b is formed radially outward of each of the first grooves 23a. In this way, the first yokes 18 are radially arranged on the first axial end of the coil bobbin 16. The radially outward surface of the first flange 16b also has a plurality of second notches 23c (e.g., sixteen). The second notches 23c are formed between adjacent first notches 23b. The second notches 23c are shallower than the first notches 23b. The second notches 23c serve to support tip end portions of the second yokes 19, i.e., the free end portions of the second yokes 19 that are located nearer to the first flange 16b of the coil bobbin 16.

A radially outward surface of the second flange 16c is provided with a plurality of (e.g., sixteen) second grooves 23d. The second grooves 23d are spaced apart from one another in a circumferential direction. The second grooves 23d are used to attach the second yokes 19. The second grooves 23d are arranged in positions between the first grooves 23a as viewed in an axial direction of the coil bobbin 16. Thus, the second grooves 22c are arranged in positions that are the same as the positions of the second notches 23c along the circumferential direction as indicated by the arrow A (circumferential direction). The second grooves 23d extend radially outward from the through hole 16d. One of the second grooves 23d has two through holes 23g for drawing the two ends of the coil 17 to the outside of the second flange 16c and a slit 23h for passing the coil 17 in a radial direction. A third notch 23e is formed by notching out a radially outward portion of the second flange 16c. Thus, the third notch 23e is formed radially outward of each of the second grooves 23d. The radially outward surface of the second flange 16c is also has a plurality of fourth notches 23f (e.g., sixteen). The fourth notches 23f are formed between adjacent third notches 23e. The fourth notches 23f are shallower than the third notches 23e. The fourth notches 23f serve to support tip end portions of the first yokes 18, i.e., the free end portions of the first yokes 18 located nearer the second flange 16c of the coil bobbin 16.

A shown in FIG. 1, the coil 17 is wound onto the tubular section 16a of the coil bobbin 16. The coil 17 is made of a conductive metal wire material, such as a copper wire or an aluminum alloy wire. Two electrical wires 17a are electrically connected to both ends of the coil 17. The electrical wires 17a are provided to carry electric power generated in the coil 17 to the outside of the hub. The electrical wires 17a are arranged in the axial groove 15c explained previously.

Figure 5:
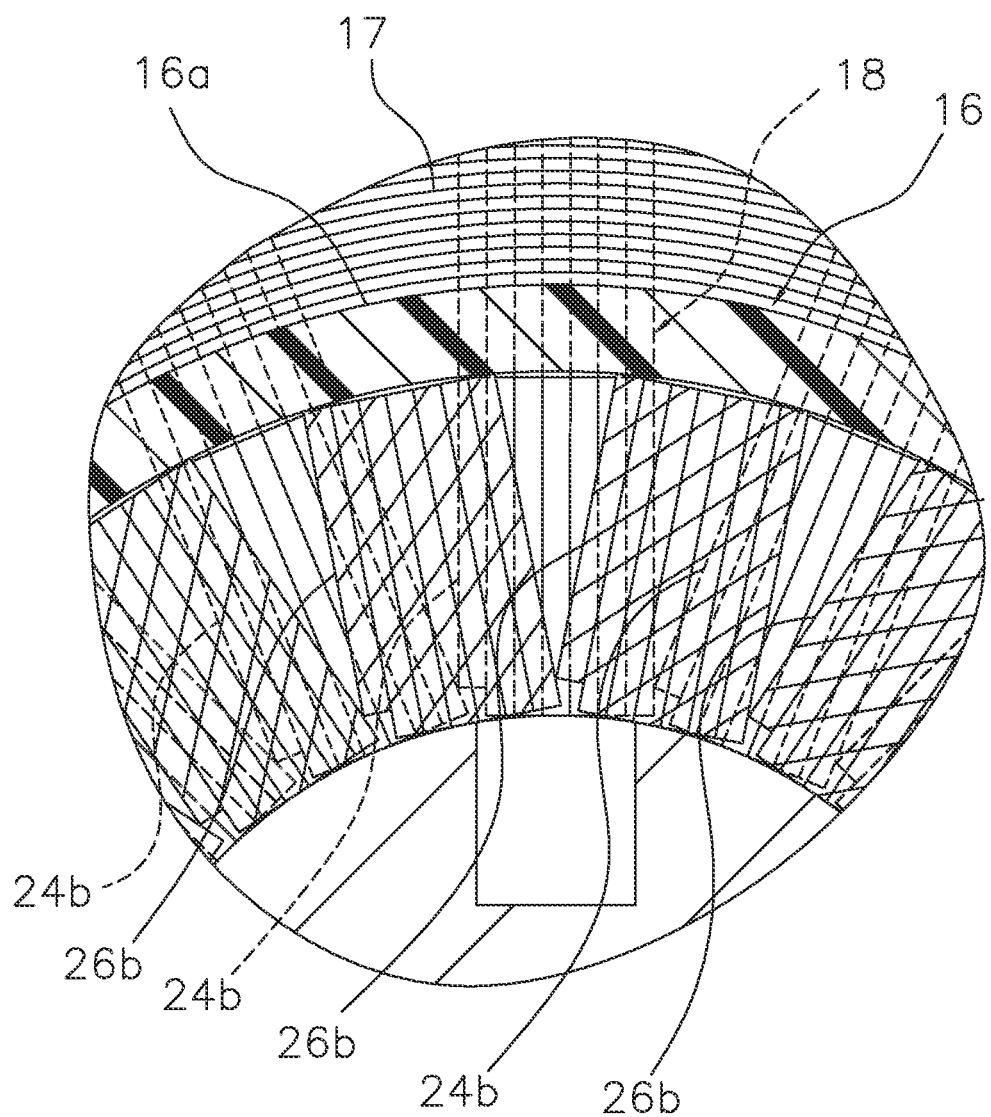
FIG. 5 is an enlarged elevational view of a portion of the stator located in region R of FIG. 4 at the second insertion sections.

As shown in FIG. 2 and FIG. 4, each of the first yokes 18 is a laminated yoke made up of a plurality of first laminate pieces 25a (e.g., seven). The laminate pieces 25a are laminated together in the circumferential direction as indicated by the arrow A (circumferential direction) of the coil bobbin 16. The laminate pieces 25a are made of, for example, silicon steel sheets (more specifically, non-oriented silicon steel sheets) on the surface of which an oxide film has been formed. The laminate pieces 25a are examples of a plate-like member. Although the laminate pieces 25a are only shown on one of the first yokes 18 in FIG. 2, all of the first yokes 18 are made of laminate pieces 25a. As shown in FIG. 5, in order to reduce the circumferential gaps between the first yokes 18, one of the laminate pieces 25a of each of the first yokes 18 has a shorter dimension in a radial direction than the other laminate pieces 25a of the first yoke 18.

Each of the first yokes 18 has a first magnetic pole section 24a that extends linearly from the first end toward the second end of the coil bobbin 16 along the axial direction (B-direction) on the external circumferential surface of the coil bobbin 16. In other words, the first magnetic pole sections 24a extend along the axial direction (B-direction) of the coil bobbin 16 and face the external circumferential surface of the coil bobbin 16. Each of the first yokes 18 also has a first insertion section 24b and a first connecting section 24c joining the first magnetic pole section 24a and the first insertion section 24b together. The first insertion sections 24b extend along the axial direction (B-direction) of the coil bobbin 16 and face the internal circumferential surface of the coil bobbin 16. The first connecting sections 24c extend a radial direction of the coil bobbin 16 and connect the first magnetic pole sections 24a and the first insertion sections 24b together, respectively.

The first magnetic pole sections 24a are arranged on a radially outward side of the coil 17 and extend from the one end of the coil bobbin 16 toward the other end along the axial direction indicated by the arrow B (axial direction). A radially outward portion of each of the first magnetic pole sections 24a is arranged such that the radially outward portion is substantially parallel to the hub shaft 15. Each of the first magnetic pole sections 24a has a radially inward portion that slants toward the radially outward portion as one moves from the first end of the coil bobbin 16 toward the second end. A tip end portion of the radially inward portion is substantially parallel to the hub shaft 15. Base end sections 24d are located at the end of the first magnetic pole sections 24a that corresponds to the one end of the coil bobbin 16. The base end sections 24d are supported on the first notches 23b. Tip end sections 24e are located at the end of the first magnetic pole sections 24a to the other end of the coil bobbin 16. The tip end sections 24e are supported on the fourth notches 23f.

As shown in FIG. 1, the first insertion sections 24b are inserted into the through hole 16d of the coil bobbin 16 such that they are arranged between the tubular section 16a and the external circumferential surface of the hub shaft 15. The first insertion sections 24b extend from the one end of the coil bobbin 16 toward the other end along the axial direction as indicated by the arrow B. More specifically, the second insertion sections 26b extend along the axial direction as indicated by the arrow B to a position near a middle portion of the through hole 16d.

The first connecting sections 24c abut against the coil bobbin 16. The first connecting sections 24c are positioned in the circumferential direction of the coil bobbin 16. More specifically, the first connecting sections 24c are fixed to the coil bobbin 16 by being fitted into the first grooves 23a of the first flange 16b. As a result, the first yokes 18 cannot rotate with respect to the coil bobbin 16.

In this embodiment, the second yokes 19 have the same shape as the first yokes 18. Each of the second yokes 19 is a laminated yoke made up of a plurality of second laminate pieces 25b (e.g., seven). The laminate pieces 25b are laminated together in the direction of the arrow A (circumferential direction) of the coil bobbin 16. The laminate pieces 25b are made of, for example, silicon steel sheets (more specifically, non-oriented silicon steel sheets) on the surface of which an oxide film has been formed. The laminate pieces 25b are examples of a plate-like member. Although the laminate pieces 25b are only shown on one of the second yokes 19 in FIG. 2, all of the second yokes 19 are made of laminate pieces 25b.

Each of the second yokes 19 has a second magnetic pole section 26a that extends linearly from the first end toward the second end of the coil bobbin 16 along the axial direction (B-direction) on the external circumferential surface of the coil bobbin 16. In other words, the second magnetic pole sections 26a extend along the axial direction (B-direction) of the coil bobbin 16 and face the external circumferential surface of the coil bobbin 16. Each of the second yokes 26 also has a second insertion section 26b and a second connecting section 26c joining the second magnetic pole section 26a and the second insertion section 26b together. The second insertion sections 26b extend along the axial direction (B-direction) of the coil bobbin 16 and face the internal circumferential surface of the coil bobbin 16. The second connecting sections 26c extend a radial direction of the coil bobbin 16 and connect the second magnetic pole sections 26a and the second insertion sections 26b together, respectively. As shown in FIG. 5, in order to reduce the circumferential gaps between the second yokes 19, one of the laminate pieces 25b of each of the second yokes 19 has a shorter dimension in a radial direction than the other laminate pieces 25b of the second yoke 19.

The second magnetic pole section 26a is arranged on a radially outward side of the coil 17 and extends from the other of the coil bobbin 16 to the one end. The second magnetic pole sections 26a are arranged alternately with respect to the first magnetic pole sections 24a along the circumferential direction as indicated by the arrow A (see FIGS. 2 and 4). A radially outward portion of each of the second magnetic pole sections 26a is arranged such that it is substantially parallel to the hub shaft 15. Each of the second magnetic pole sections 26a has a radially inward portion that slants toward the radially outward portion as one moves from the second end of the annular member 16 toward the first end. A tip end portion of the radially inward portion is substantially parallel to the hub shaft 15. Base end sections 26d are located at the end of the second magnetic pole sections 26a that corresponds to the other end of the annular member 16. The base end sections 26d are supported on the third notches 23e. Tip end sections 26e are located at the end of the second extended sections 26a that corresponds to the one end of the annular member 16. The tip end sections 26e are supported on the second notches 23c.

As shown in FIG. 1, the second insertion sections 26b are inserted into the through hole 16d of the coil bobbin 16 such that they are arranged between the tubular section 16a and the external circumferential surface of the hub shaft 15. The second insertion sections 26b extend from the other end of the coil bobbin 16 toward the one end along the axial direction as indicated by the arrow. More specifically, the second insertion sections 26b extend along the axial direction as indicated by the arrow B to a position near a middle portion of the through hole 16d. As a result, the second insertion sections 26b are magnetically coupled to the first insertion sections 24b. Additionally, as shown in FIG. 5, a first (free) end portion of the first insertion section 24b of each of the first yokes 18 abuts against two second (free) end portions of the second insertion sections 26b of two adjacent second yokes 19. Consequently, the second end portions of the second insertion section 26b of each of the second yokes 19 abuts against the first end portions of the first insertion sections 24b of two adjacent first yokes 18. As a result, all of the first yokes 18 and the second yokes 19 are magnetically coupled at the first insertion sections 24b and the second insertion sections 26b.

The second connecting sections 26c abut against the coil bobbin 16. The second connecting sections 26c are positioned in the circumferential direction of the coil bobbin 16. More specifically, the second connecting sections 26c are fixed to the coil bobbin 16 by being fitted into the second grooves 23d of the second flange 16c. As a result, the second yokes 19 cannot rotate with respect to the coil bobbin 16.

The coupling member 20 is a ring-shaped plate-like member as shown in FIGS. 2 and 4. The coupling member 20 has a projection 20a that engages with the axial groove 15c of the hub shaft 15. The coupling member 20 has sixteen protrusions 20b that are arranged between adjacent second yokes 19. The projection 20a protrudes radially inward from an internal circumferential surface of the coupling member 20. The protrusions 20b are arranged to be spaced apart from one another in a circumferential direction. The protrusions 20b protrude in the B direction. As indicated with a double-dot chain line in FIG. 4, the protrusions 20b are arranged between the second connecting sections 26c of adjacent second yokes 19 such that each of the protrusions 20b contacts both of the adjacent ones of the second connecting sections 26c. In this way, the second yoke 19 is coupled non-rotatably to the hub shaft 15. Also, since the second yokes 19 are coupled non-rotatably to the coil bobbin 16, the coil bobbin 16 and the hub shaft 15 are coupled such that they cannot rotate relative to each other.

As shown in FIGS. 1 and 2, the first positioning member 21 is crimped to the hub shaft 15 at the one end of the coil bobbin 16. The first positioning member 21 is, for example, an aluminum alloy, an iron-based alloy, or another metal. As shown in FIG. 2, the first positioning member 21 has a first brim section 21a that contacts the first yokes 18, and a first cylindrical section 21b that fits onto an external circumferential surface of the hub shaft 15. The first cylindrical section 21b is arranged in a position where it overlaps with the first annular groove 15d when the first brim section 21a contacts the first yokes 18. The first positioning member 21 is crimped onto the hub shaft 15 such that the first positioning member 21 cannot move along the axial direction indicated by the arrow B by deforming the first cylindrical section 21b toward the first annular groove 15d.

As shown in FIGS. 1 and 2, the second positioning member 22 is crimped to the hub shaft 15 at the other end of the coil bobbin 16. The second positioning member 22 is made of the same material as the first positioning member 21. As shown in FIG. 2, similarly to the first positioning member 21, the second positioning member 22 has a second brim section 22a that contacts the second yokes 19, and a second cylindrical section 22b that fits onto an external circumferential surface of the hub shaft 15. The second cylindrical section 22b is arranged in a position where the second cylindrical section 22b overlaps with the second annular groove 15e when the second brim section 22a contacts the second yokes 19. The second positioning member 22 is crimped onto the hub shaft 15 such that the second positioning member 22 cannot move along the axial direction as indicated by the arrow B by deforming the second cylindrical section 22b toward the second annular groove 15e.

In this way, the first positioning member 21 and the second positioning member 22 serve to position the annular member 16, the first yokes 18, the second yokes 19, and the coupling member 20 along the axial direction as indicated by the arrow B (axial direction). Thus, an excessively large axial force does not act on the laminate pieces 25a of the first yokes 18 and the laminate pieces 25b of the second yokes 19, which can happen during axial positioning using, for example, a nut. As a result, the first yokes 18 and the second yokes 19 do not readily deform.

As shown in FIG. 1, the hub shell 14 is rotatably supported on the hub shaft 15 by a first bearing 30 and a second bearing 31. A position of the first bearing 30 along the axial direction as indicated by the arrow B is adjusted with a nut member 51. The hub shell 14 has a cylindrical shell body 40 in which the first bearing 30 is arranged. A lid member 42 is attached to the shell body 40. The lid member 42 couples the second bearing 31 to the hub shell 14. Two hub flanges 40a are arranged on the shell body 40 to be spaced apart from each other along the axial direction as indicated by the arrow B and serve as a place where the hub shell 14 is connected to a rim using a plurality of spokes.

The magnet 12 is fixed to an internal circumferential surface of the shell body 40. A back yoke 27 is arranged between the magnet 12 and the shell body 40. An internal circumferential surface of the magnet 12 is arranged such that a slight gap exists between the internal circumferential surface of the magnet 12 and a radially outward portion of the stator 18 and a radially outward portion of the second yoke 19.

Although in the previously explained embodiment the hub shaft 15 is fastened to the front fork with a quick release mechanism 11, it is acceptable to use a solid hub shaft fastened to the front fork with nuts.

Although in the previously explained embodiment the coupling member 20 is coupled to the second yokes 19, the present invention is not limited to such a configuration. If the axial groove is formed from the other end so as to extend beyond the stator, then it is acceptable for the coupling member 20 to be coupled to the first yokes. It is also acceptable for the coupling member to be coupled to both the first yokes and the second yokes.

Although in the previously explained embodiments the first yokes and the second yokes are laminated yokes, the first yokes and the second yokes are not limited to laminated yokes.

Although in the previously explained embodiments the stator 13 is positioned in the axial direction as indicated by the arrow B with a first positioning member and a second positioning member that are crimped to the hub shaft, the present invention is not limited to such a configuration. It is acceptable to provide an externally threaded section on the external circumferential surface of the hub shaft and position the stator at one end with a nut member installed onto the externally threaded section. It is also acceptable to position one end of the stator with a nut member and position the other end with an annular protrusion provided on the hub shaft either integrally or as a separate entity.

Although in the previously explained embodiment the present invention is applied to a bicycle generator hub fastened to a front fork of a bicycle, the present invention is not limited to such an application. The present invention is also applicable to a bicycle generator hub fastened to a rear end of a bicycle frame.

Thus, while only selected embodiments have been chosen to illustrate the present invention, it will be apparent to those skilled in the art from this disclosure that various changes and modifications can be made herein without departing from the scope of the invention as defined in the appended claims. In other words, the foregoing descriptions of the embodiments according to the present invention are provided for illustration only, and not for the purpose of limiting the invention as defined by the appended claims and their equivalents.

What is claimed is:

1. A stator for a bicycle generator hub, the stator comprising:
    a coil bobbin including a tubular section having a first axial end, a second axial end, an internal circumferential surface disposed between the first and second axial ends and an external circumferential surface disposed between the first and second axial ends;
    a plurality of first yokes radially arranged on the first axial end of the coil bobbin, each of the first yokes including a first magnetic pole section extending along an axial direction of the coil bobbin and facing the external circumferential surface of the coil bobbin, a first insertion section extending along the axial direction of the coil bobbin and facing the internal circumferential surface of the coil bobbin, and a first connecting section extending radial direction of the coil bobbin and connecting the first magnetic pole section and the first insertion section together; and
    a plurality of second yokes radially arranged on the second axial end of the coil bobbin, each of the second yokes including a second magnetic pole section extending along an axial direction of the coil bobbin and facing the external circumferential surface of the coil bobbin, a second insertion section extending along the axial direction of the coil bobbin and facing the internal circumferential surface of the coil bobbin, and a second connecting section extending radial direction of the coil bobbin and connecting the second magnetic pole section and the second insertion section together;
    each of the first insertion sections having a first end portion, each of the second insertion sections having a second end portion, each of the first end portions of the first insertion sections contacting two corresponding ones of the second end portions of the second insertion sections.

2. The stator as recited in claim 1, wherein
    each of the first yokes is made of a plurality of plates that are laminated together in a circumferential direction of the coil bobbin.

3. The stator as recited in claim 1, wherein
    each of the second yokes is made of a plurality of plates laminated together in a circumferential direction of the coil bobbin.

4. The stator as recited in claim 1, wherein
    the first magnetic pole sections of the first yokes extend linearly along the axial direction of the coil bobbin.

5. The stator as recited in claim 1, wherein
    the second magnetic pole sections of the second yokes extend linearly along the axial direction of the coil bobbin.

6. The stator as recited in claim 1, wherein
    the first connecting sections of the first yokes and the second connecting sections of the second yokes engage the coil bobbin so as to limit circumferential movement of first and second yokes relative to the coil bobbin.

7. The stator as recited in claim 6, further comprising
    a hub shaft disposed in the tubular section of the coil bobbin, the hub shaft having a groove that extends in the axial direction of the coil bobbin; and
    a coupling member non-rotatable coupling the coil bobbin and the hub shaft together, the coupling member having a projection that is engaged with the groove of the hub shaft and a protrusion that is arranged between two adjacent ones of the second yokes.

8. A bicycle generator hub equipped with the stator as recited in claim 1, further comprising:
    a hub shaft disposed in the tubular section of the coil bobbin;
    a hub shell rotatably disposed on the hub shaft; and
    an annular magnet disposed on the hub shell.

9. The stator as recited in claim 1, wherein
    the contacting of the first end portions of the first insertion sections with respect to corresponding ones of the second end portions of the second insertion sections occurs at axially facing surfaces of the first and second end portions.

10. The stator as recited in claim 1, wherein the contacting of the first end portions of the first insertion sections with respect to corresponding ones of the second end portions of the second insertion sections occurs inside a through hole of the coil bobbin.

* * * * *